United States Patent
Rohr et al.

(10) Patent No.: US 9,393,855 B2
(45) Date of Patent: Jul. 19, 2016

(54) TRUCK CAP ASSEMBLY

(71) Applicant: A.R.E. Accessories, LLC, Massillon, OH (US)

(72) Inventors: Andrew N. Rohr, Wadsworth, OH (US); Thomas M. Ertl, Wooster, OH (US); Todd S. Dreher, Orrville, OH (US)

(73) Assignee: A.R.E. Accessories, LLC, Massillon, OH (US)

( * ) Notice: Subject to any disclaimer, the term of this patent is extended or adjusted under 35 U.S.C. 154(b) by 0 days.

(21) Appl. No.: 14/451,955

(22) Filed: Aug. 5, 2014

(65) Prior Publication Data

US 2016/0039275 A1    Feb. 11, 2016

(51) Int. Cl.
*B60J 7/16* (2006.01)
*B60J 5/10* (2006.01)
*B62D 33/02* (2006.01)

(52) U.S. Cl.
CPC ............... *B60J 7/1621* (2013.01); *B60J 5/108* (2013.01); *B62D 33/02* (2013.01)

(58) Field of Classification Search
CPC ........ B60J 7/1621; B60J 7/141; B60J 7/1614; B60J 7/102; B60J 5/108; B62D 33/02
See application file for complete search history.

(56) References Cited

U.S. PATENT DOCUMENTS

| | | | |
|---|---|---|---|
| 3,765,717 A * | 10/1973 | Garvert | B60J 7/141 296/100.07 |
| D581,859 S | 12/2008 | Bogard | |
| D581,860 S | 12/2008 | Bogard | |
| 7,946,643 B2 * | 5/2011 | Getschel | B60J 7/1621 296/100.1 |
| D678,173 S | 3/2013 | McIntire | |
| D687,760 S | 8/2013 | Gros | |
| D687,761 S | 8/2013 | Gros | |
| D690,256 S | 9/2013 | Ewringmann | |
| 2001/0038225 A1 | 11/2001 | Muirhead | |

* cited by examiner

*Primary Examiner* — Glenn Dayoan
*Assistant Examiner* — Melissa A Black
(74) *Attorney, Agent, or Firm* — Harness, Dickey & Pierce, PLC

(57) ABSTRACT

A truck cap assembly for a cargo hold of a pickup truck. The truck cap assembly includes a truck cap pivotally engaged at one end with a region of the cargo hold, said truck cap being pivotable between an open position and a closed position; an aperture defined in the truck cap and extending between a top surface and a bottom surface thereof; said aperture being in communication with an interior of the cargo hold; and a door assembly provided on the truck cap and being movable between a closed position where access to the aperture is blocked and an open position where the aperture is accessible. The door assembly includes a door that is complementary in size and shape to the aperture and the door is movable, particularly pivotable, relative to a top surface of the truck cap.

22 Claims, 11 Drawing Sheets

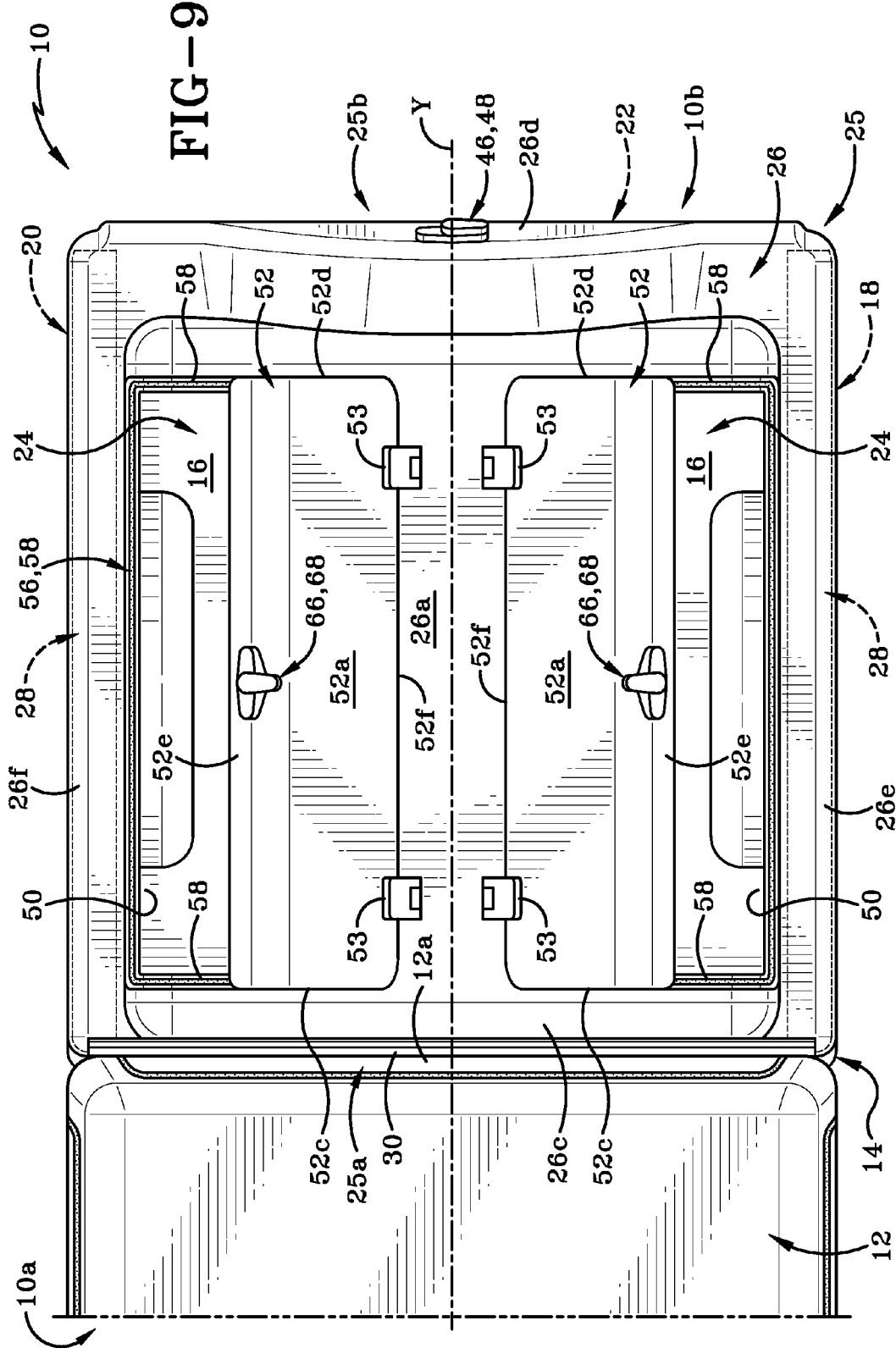

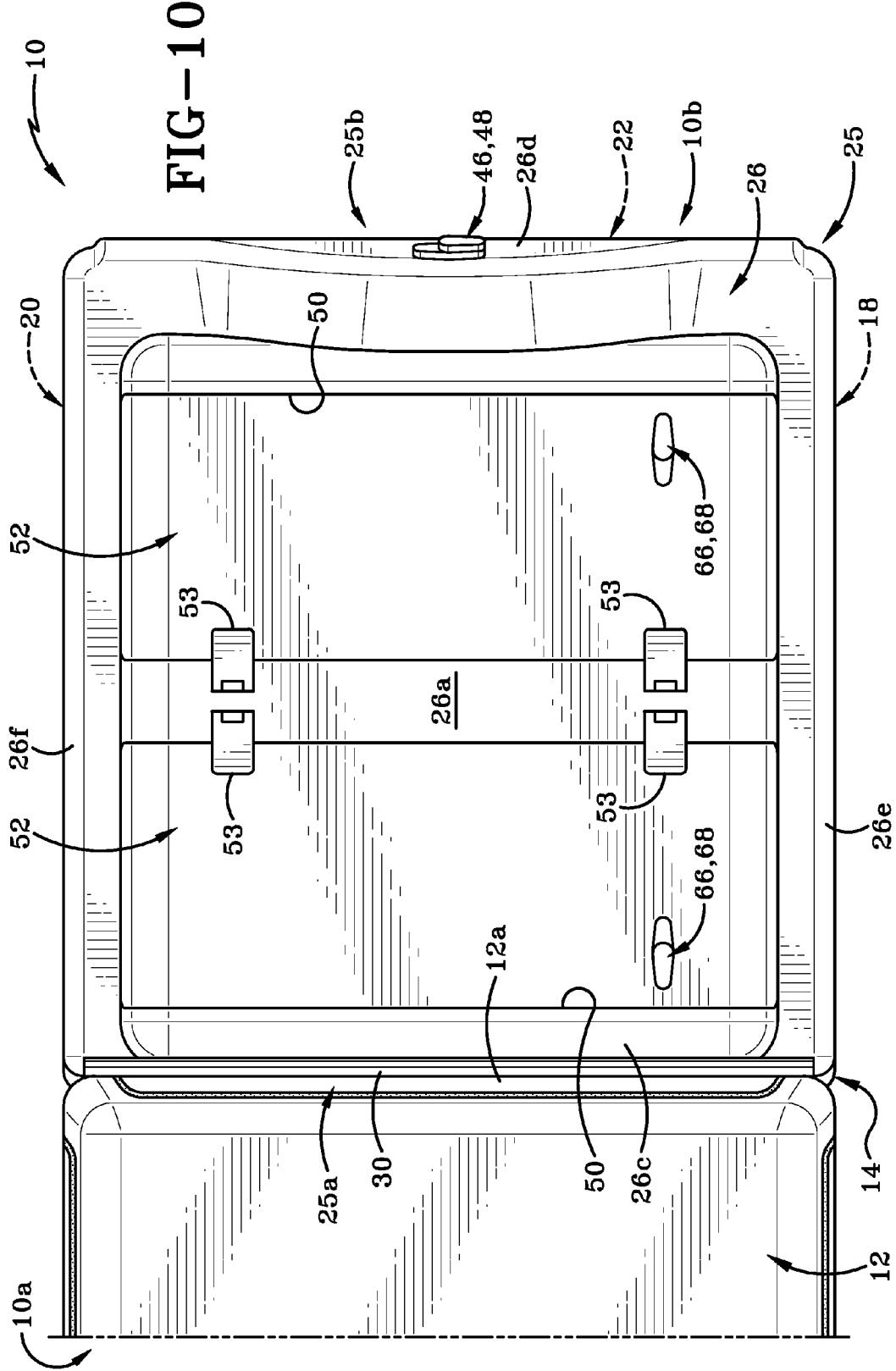

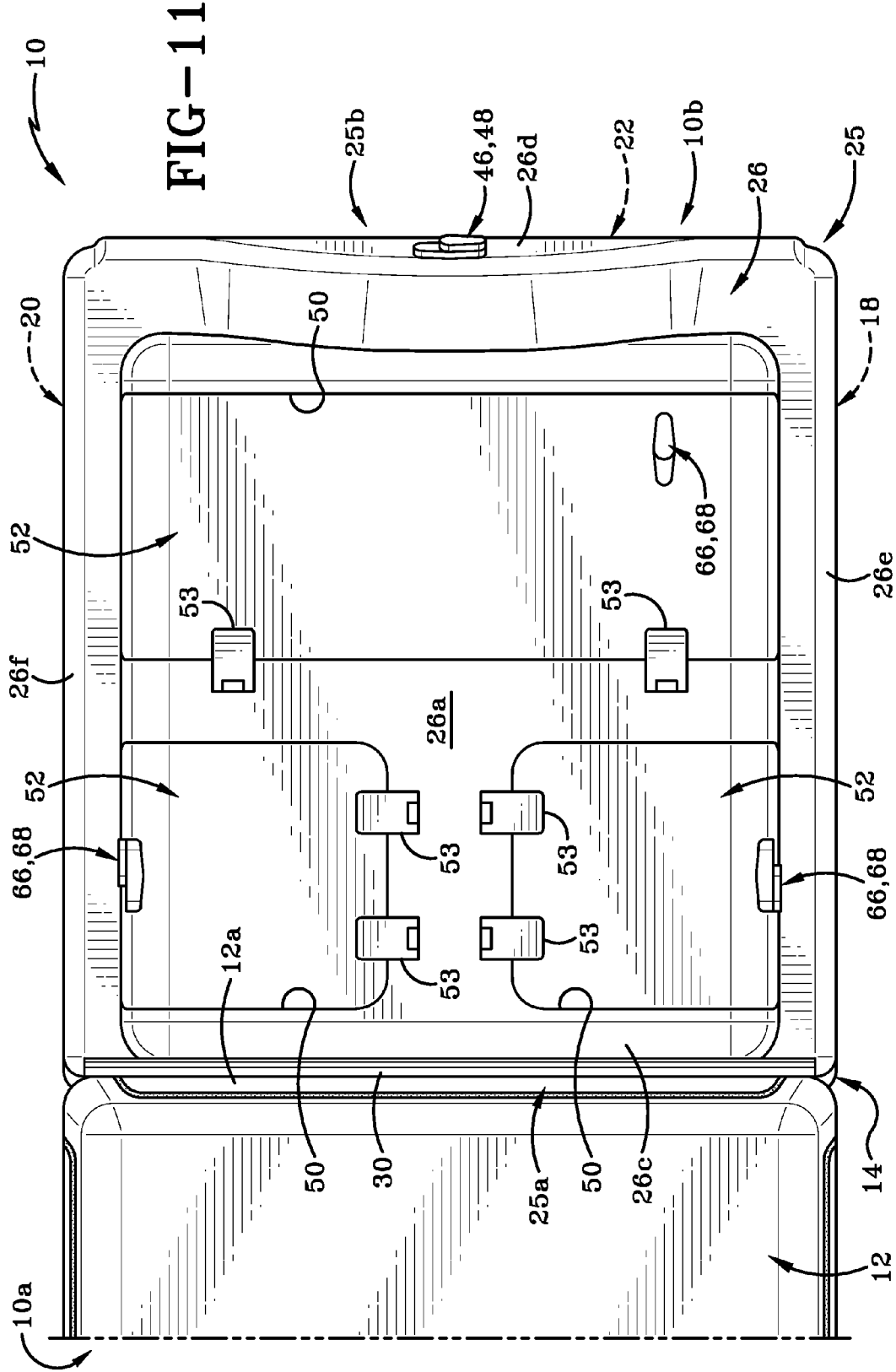

TRUCK CAP ASSEMBLY

BACKGROUND OF THE INVENTION

1. Technical Field

This invention relates generally to trucks. More particularly, the invention relates to truck caps for covering a cargo bed of a truck, particularly a pickup truck. Specifically, the invention is directed to a truck cap assembly which includes a truck cap that is pivotally connected at one end to a frame adjacent the truck cab and which is able to be rotated to an open position to allow access to substantially all of the truck bed. The truck cap further includes one or more doors that selectively permit access to particular regions of the truck bed while the hinged cap is in a closed position.

2. Background Information

Owners of pickup trucks will frequently have a truck cap installed on their vehicle in order to protect and secure cargo that is carried in the cargo hold of the truck. The truck cap is mounted in such a way that it will extend over the opening to the cargo hold and block access thereto. In order to access any cargo carried on the truck bed, it is necessary to move part or all of the truck cap out of the way. This has been accomplished in a number of ways. In some truck caps, sections slide relative to each other so as to enable the driver to access the bed. In other truck caps, butterfly type doors are provided to permit access to the bed. In either of these instances, only part of the bed is accessible. If the driver wishes to load cargo that is too large to fit through the openings created by the sliding sections or the butterfly doors, the cap itself would need to be entirely removed from the vehicle.

Other truck caps are pivoted to a frame attached to the vehicle and are movable between an open position and a closed position. In some instances, the cap is pivoted at one end, particularly the end adjacent the truck cab. The cap may be rotated into the open position to provide access to substantially the entire bed. However, it is very difficult to access the section of the bed that is adjacent the cab because at this region the gap between the cap and the sides of the truck is only a matter of a few inches. It is therefore extremely difficult to place any cargo at that part of the cargo hold or to remove any cargo therefrom.

SUMMARY

There is therefore a need in the art for a truck cap that enables a driver to gain easy access to all parts of the cargo hold and which enables the driver to also place larger objects into the cargo hold and to remove those larger objects therefrom.

A truck cap assembly for a cargo hold of a pickup truck is disclosed. The truck cap assembly includes a truck cap pivotally engaged at one end with a region of the cargo hold, said truck cap being pivotable between an open position and a closed position; an aperture defined in the truck cap and extending between a top surface and a bottom surface thereof; said aperture being in communication with an interior of the cargo hold; and a door assembly provided on the truck cap and being movable between a closed position where access to the aperture is blocked and an open position where the aperture is accessible. The door assembly includes a door that is complementary in size and shape to the aperture and the door is movable, particularly pivotable, relative to a top surface of the truck cap.

In one aspect, the invention may provide a truck cap assembly for a cargo hold of a pickup truck, said truck cap assembly comprising a truck cap having a wall with four sides; a pivot provided on one of the sides of said truck cap, and wherein said truck cap is movable between an open and closed position about said pivot; the top wall defining an aperture therein, said aperture extending between a top surface and a bottom surface of the wall and said aperture being adapted to be in communication with an interior of the cargo hold; and a door assembly provided on the truck cap and being movable between a closed position where access to the aperture is blocked and an open position where the aperture is accessible. The truck cap assembly may further include a frame that is adapted to be mounted to upper edges of opposed walls of the cargo hold; and wherein the truck cap is engaged with the frame and is pivotable relative to the frame between the open and closed positions. Furthermore, the door assembly may include a door that is complementary in size and shape to the aperture; said door being movable relative to a top surface of the truck cap between the open position and the closed position. The door may pivots relative to the truck cap.

In another aspect, the invention may provide, in combination, a truck including a cab and a cargo hold extending rearwardly from the cab; said cargo hold including a bed extending horizontally and rearwardly from a rear end of the cab, opposed side walls extending upwardly from the bed and rearwardly from the rear end of the cab; and a tailgate pivotally mounted to a rear end of the bed and extending between rear ends of the opposed side walls; said rear end of the cab, bed, side walls and tailgate bounding and defining an interior of the cargo hold which is adapted to carry a load; a truck cap positioned to cover an opening to the interior of the cargo hold; said truck cap having a wall with four sides, with one side being engaged at one end with a region of an upper edge of the cargo hold by way of a pivot, said truck cap being pivotable between an open position and a closed position; the top wall defining an aperture therein, where the aperture extends between a top surface and a bottom surface of the wall; said aperture being adapted to be in communication with the interior of the cargo hold; and a door assembly provided on the truck cap and being movable between a closed position where access to the aperture is blocked and an open position where the aperture is accessible.

The truck cap assembly may further include a frame that is adapted to be mounted to upper edges of the opposed side walls of the cargo hold; and wherein the truck cap is engaged with the frame and is pivotable relative to the frame between the open and closed positions. The door assembly may further include a door that is complementary in size and shape to the aperture; said door being movable relative to a top surface of the truck cap between the open position and the closed position. The door may additional pivot relative to the truck cap.

BRIEF DESCRIPTION OF THE SEVERAL VIEWS OF THE DRAWINGS

A sample embodiment of the invention is set forth in the following description, is shown in the drawings and is particularly and distinctly pointed out and set forth in the appended claims.

FIG. 9 is a top view of the truck and truck cap shown in FIG. 8;

FIG. 10 is a top view of the truck showing a second possible configuration of the doors in the truck cap; and FIG. 11 is a top view of the truck showing a third possible configuration of the doors in the truck cap.

Similar numbers refer to similar parts throughout the drawings.

DETAILED DESCRIPTION

Figure 1:
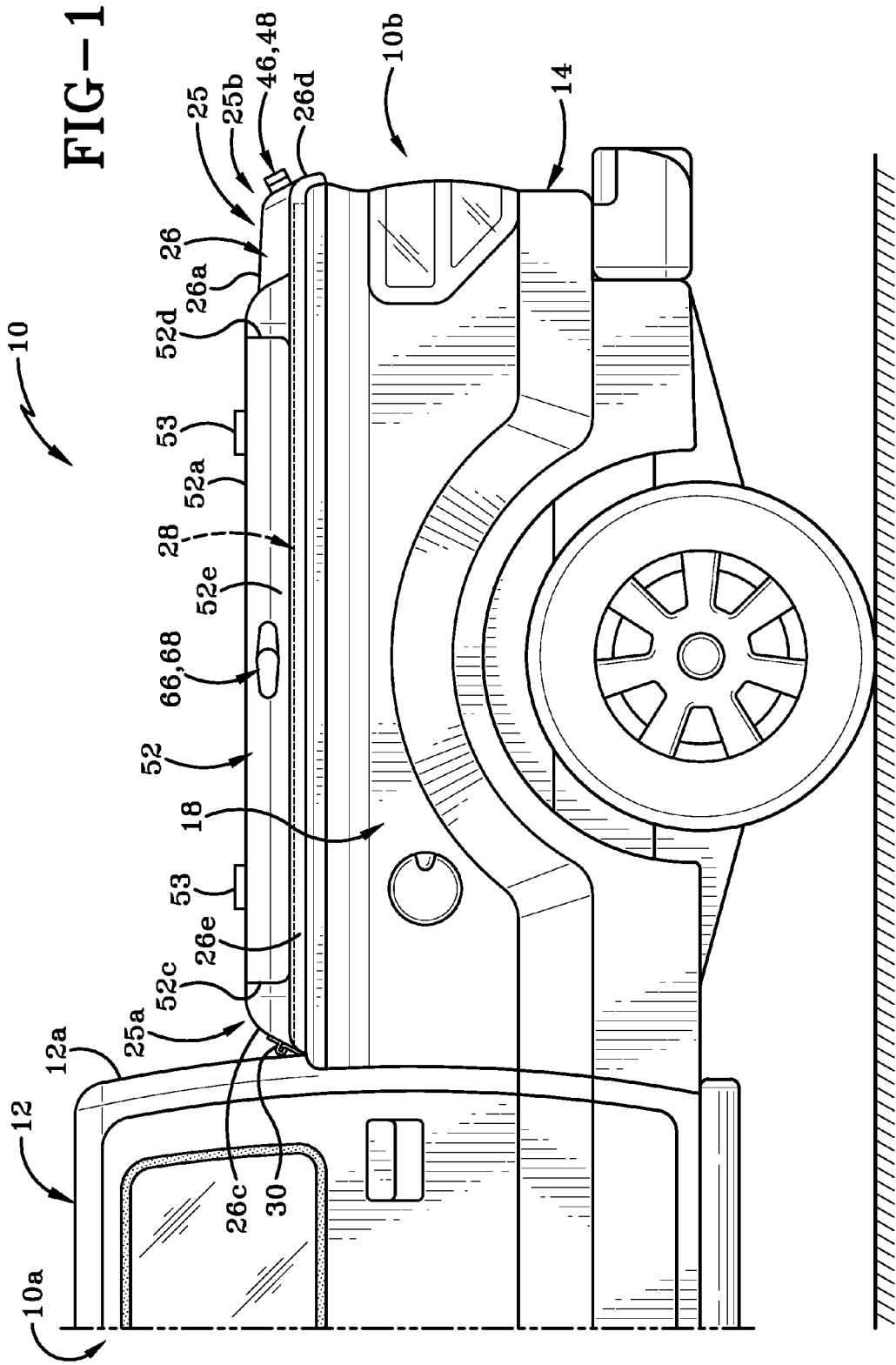
FIG. 1 is a partial side view of a pickup truck with a truck cap assembly in accordance with an aspect of the invention, where the truck cap is engaged with the cargo hold of the truck and both the truck cap and the doors therein are shown in a closed position.

Referring to FIGS. 1-9, there is shown a partial view of a typical pickup truck 10 which has a cab 12 and a cargo hold 14. Cargo hold 14 comprises a horizontal bed 16 (FIG. 5) with a pair of opposing sides 18, 20 extending upwardly therefrom. A rear end 12a of cab 12 is positioned at one end of bed 16 and a pivotable tailgate 22 (FIG. 3) is positioned at the other end of bed 16 from cab 12. Bed 16, sides 18, 20, rear end 12a and tailgate 22 all bound and define an interior 24 (FIG. 5) into which cargo may be placed. Tailgate 22 is movable between a closed position (shown in FIG. 3) and an open position (shown in FIG. 5).

In accordance with an aspect of the invention, a truck cap assembly 25 is engaged with cargo hold 14. If tailgate 22 was in the closed position and truck cap 26 was not yet engaged with truck 10, then interior 24 would be accessible through an opening defined by the uppermost edges of sides 18, 20 and tailgate 22. Once truck cap 26 is engaged with truck 10, access to interior 24 is provided in a number of ways, as will be described later herein. Truck cap 26 is provided to regulate access to interior 24.

Figure 2:
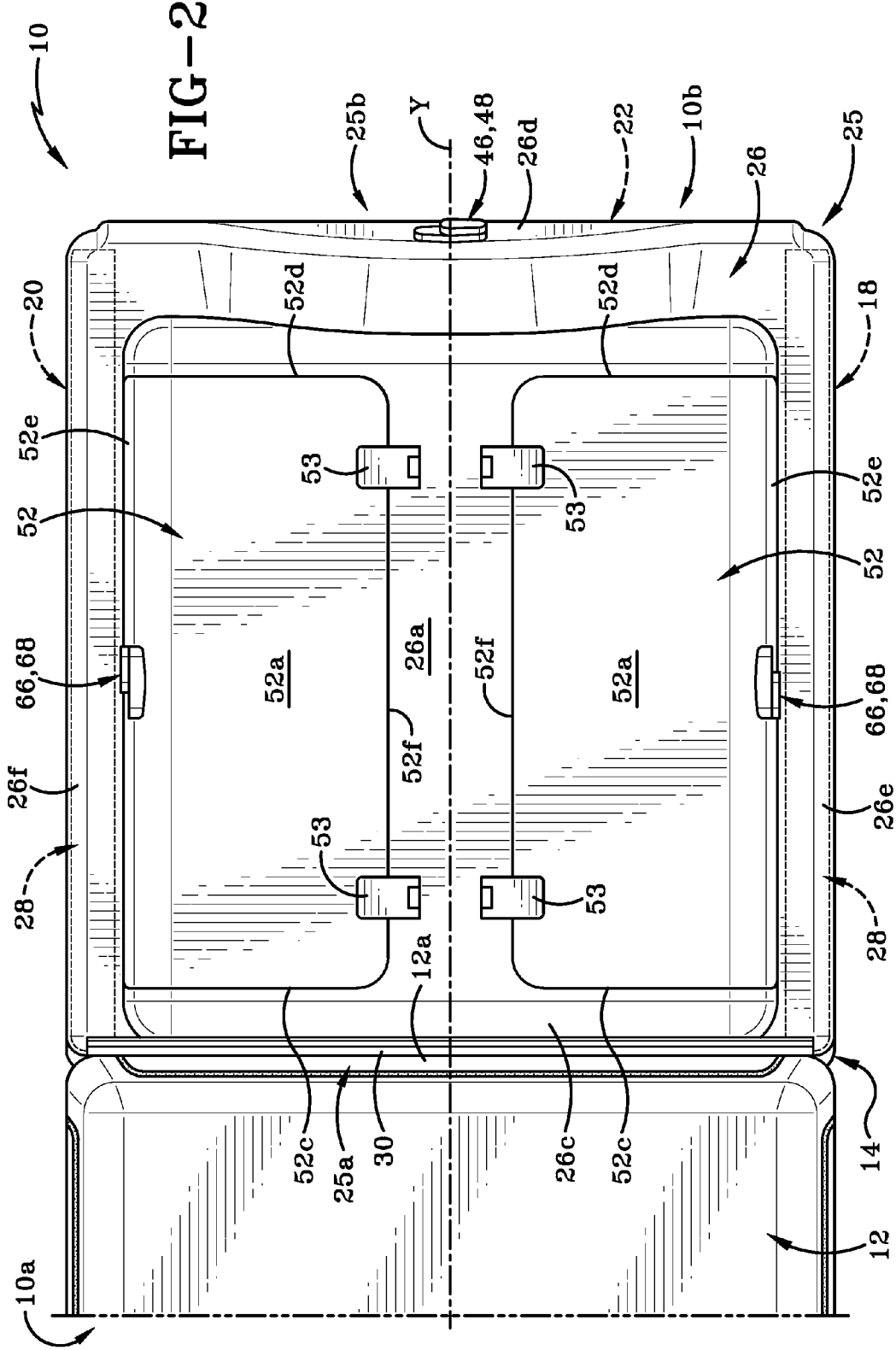
FIG. 2 is a top view of the truck shown in FIG. 1.
Figure 3:
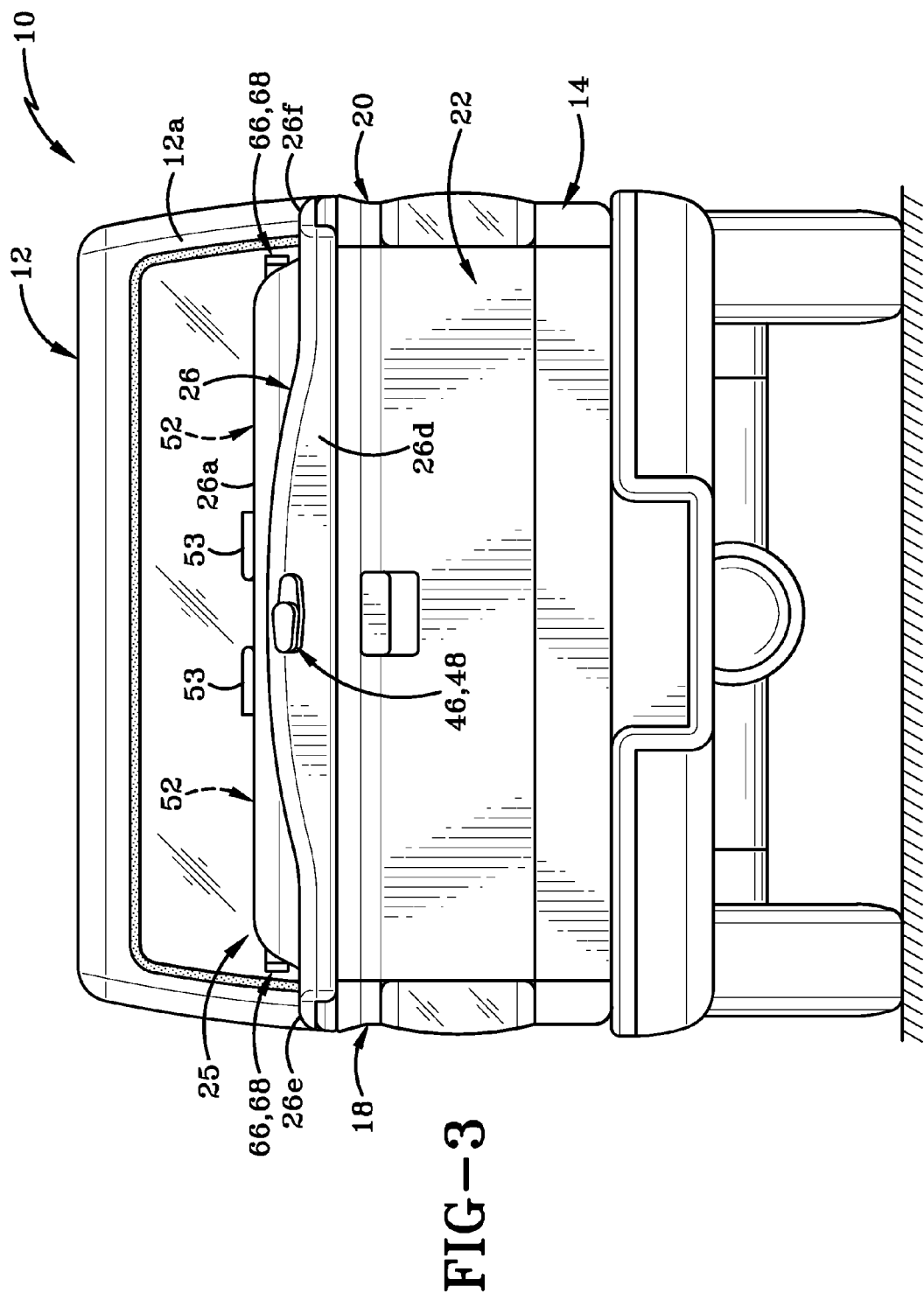
FIG. 3 is a rear view thereof.
Figure 4:
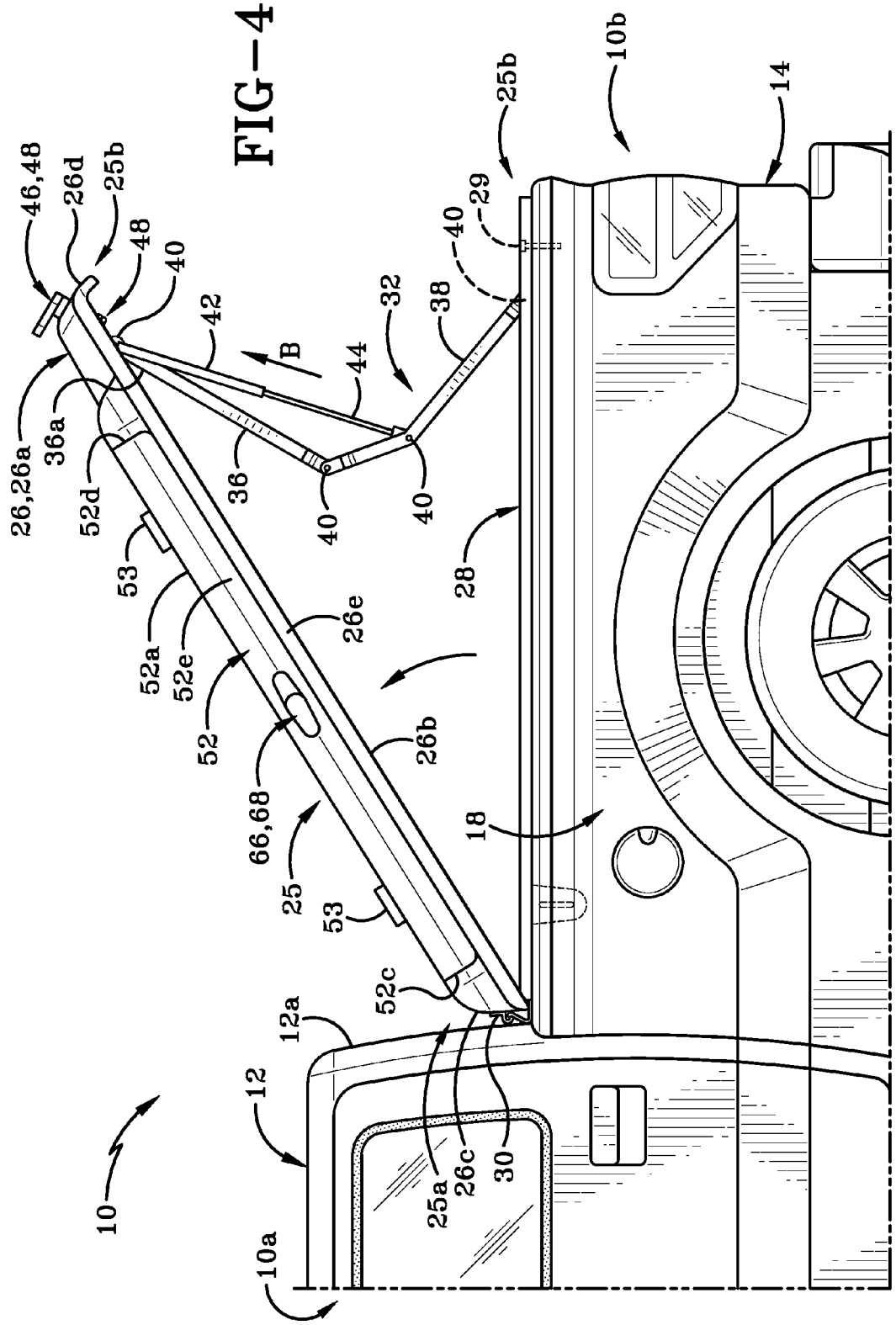
FIG. 4 is a side view of the truck with the truck cap rotated into an open position and the doors therein remaining in the closed position.
Figure 5:
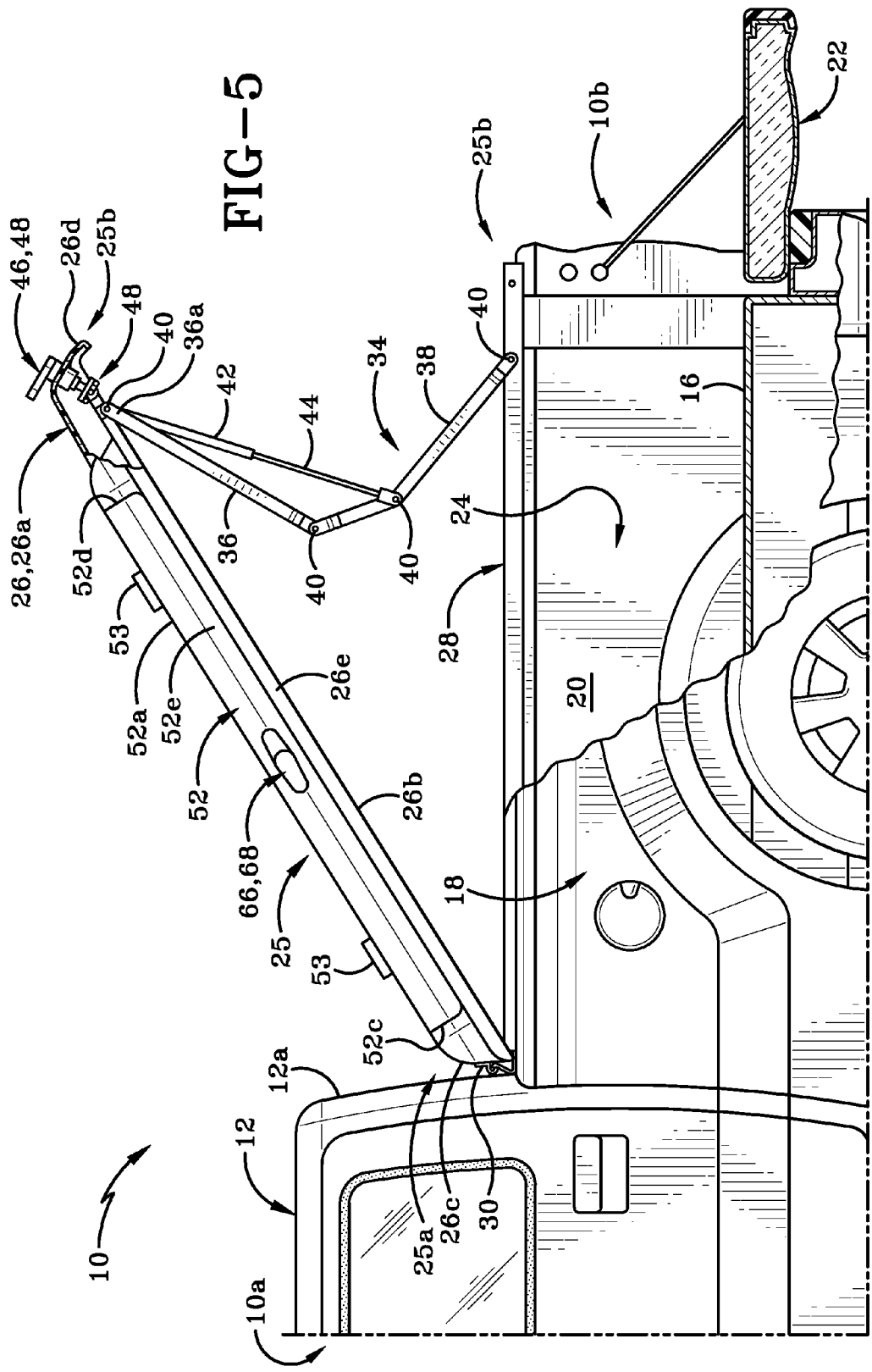
FIG. 5 is a partial cross-sectional side view of the truck of FIG. 4 showing the lock assembly on the truck cap and showing the truck with the tailgate moved to an open position.
Figure 6:
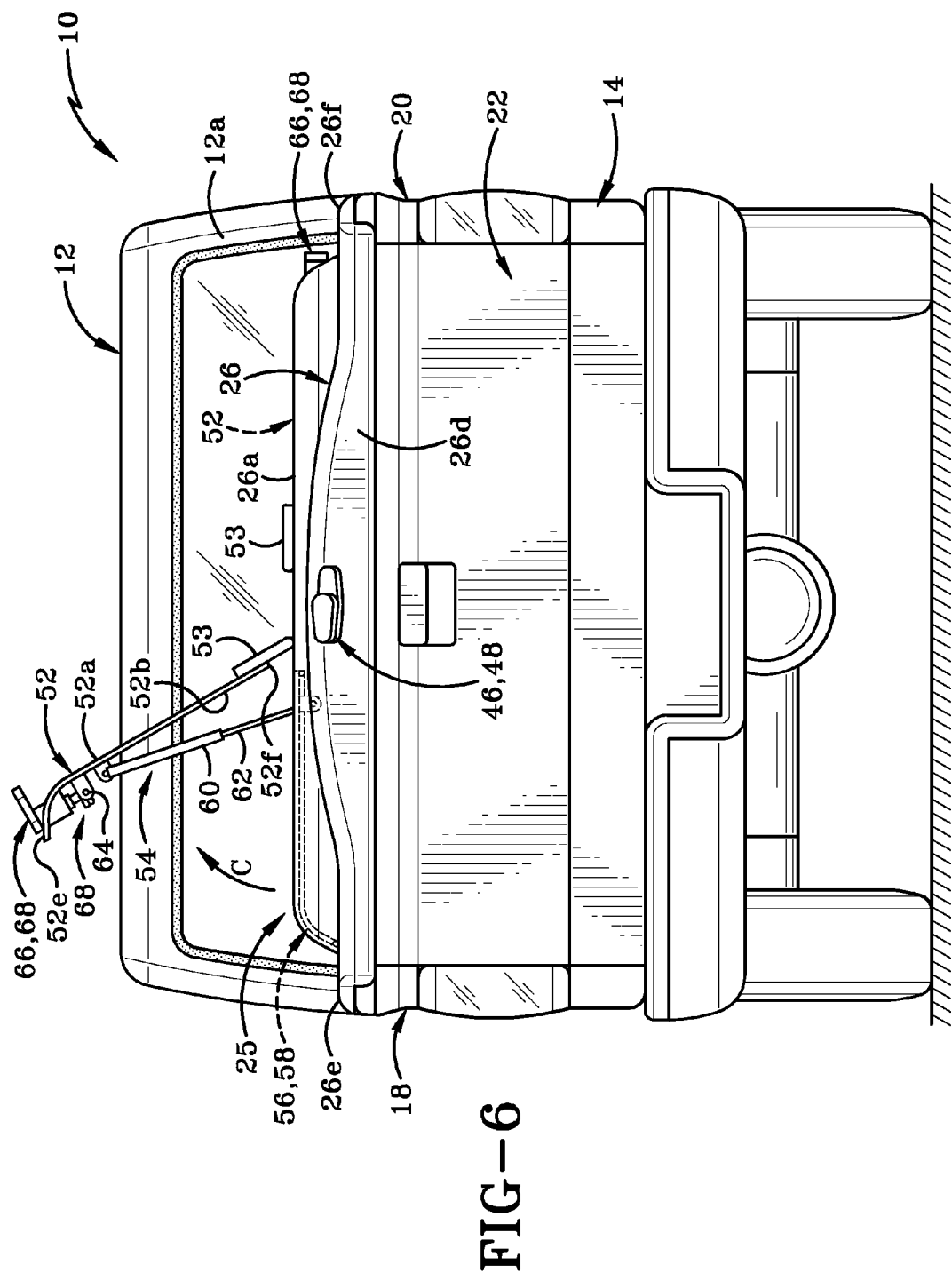
FIG. 6 is a rear view of the truck of FIG. 1 shown with the truck cap in the closed position and one of the doors in the truck cap moved to an open position.
Figure 7:
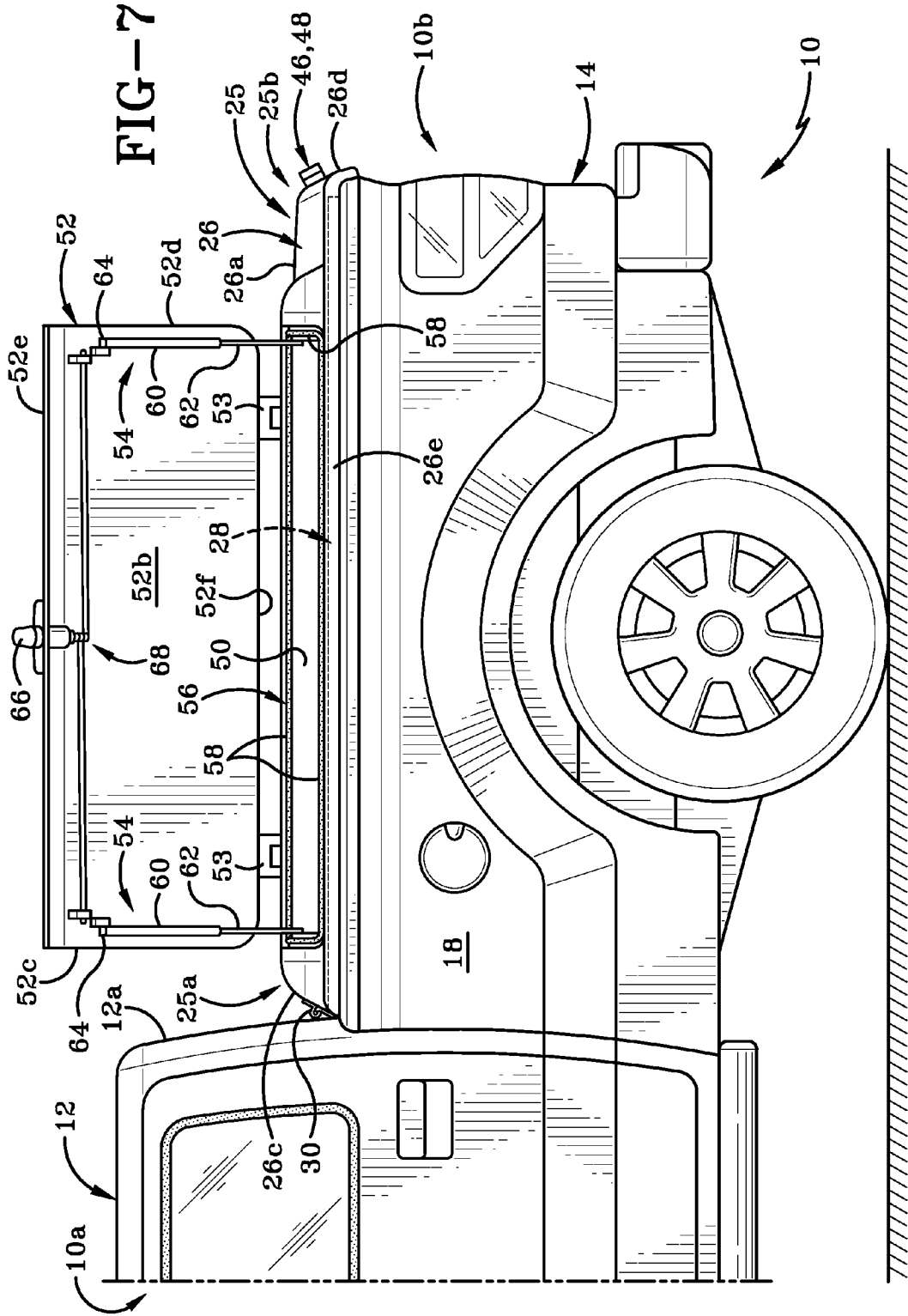
FIG. 7 is a side view of the truck and truck cap shown in FIG. 6.
Figure 8:
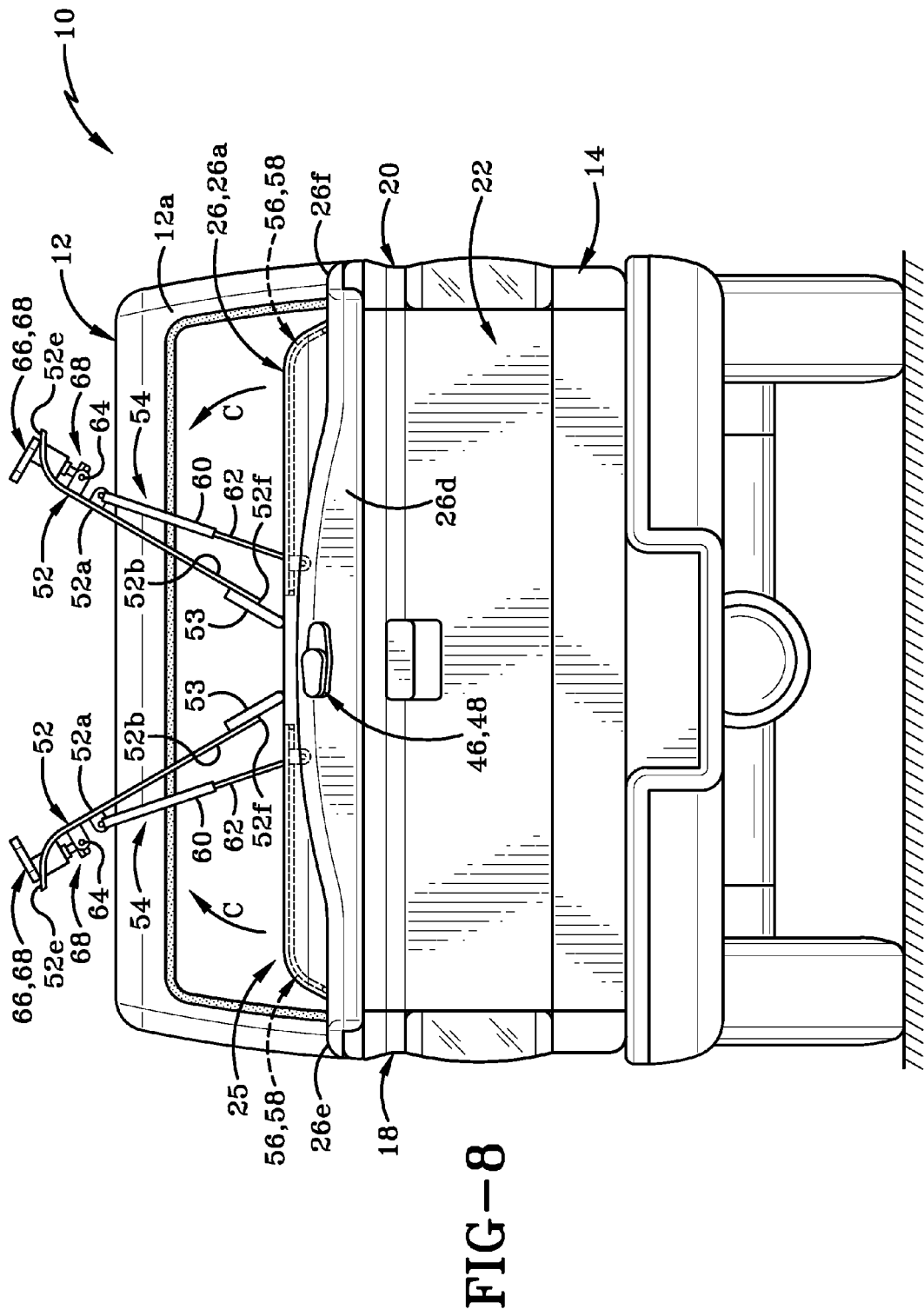
FIG. 8 is a rear view of the truck of FIG. 1 shown with the truck cap in the closed position and both of the doors in the truck cap moved to the open position.

FIGS. 1-3 show truck cap assembly 25 in a closed position where the access to interior 24 and therefore to interior 24 and bed 16 is completely blocked. FIG. 4 shows a truck cap 26 of truck cap assembly 25 rotated into an open position where access to the entire interior 24 is possible. FIG. 5 shows the truck cap 26 rotated into an open position and tailgate 22 rotated into an open position. Thus, the entire interior 24 is further accessible through the open tailgate. It should be noted however, that in these last two instances, it is quite difficult to load cargo onto bed 16 or remove it therefrom in a position that is immediately adjacent rear end 12a of cab 12. This difficulty exists because of the close proximity of the front end 25a (FIG. 5) of truck cap 26 to the top edges of side walls 18, 20. FIGS. 6-8 shows access to interior 24 being made possible by opening one or more doors 52 defined in truck cap 26, as will be later described herein. The doors provide access to particular regions of the interior 24.

Referring still to FIGS. 1-8, truck cap assembly 25 is shown in greater detail. Truck cap assembly 25 has a front end 25a and a rear end 25b. Front end 25a is positioned adjacent rear end 12a of cab 12; and back end 25b is positioned adjacent tailgate 22. Truck cap assembly 25 comprises a truck cap 26 and a cap frame 28 (FIG. 4). Cap frame 28 includes a pair of opposed frame members which are each secured to one of the top edges of sides 18, 20 by a plurality of fasteners 29.

Cap frame 28 may also include a frame member (not shown) which extends between the front ends of sides 18, 20 and is positioned adjacent rear end 12a of cab 12.

Truck cap 26 has a top surface 26a, a bottom surface 26b (FIG. 4), a front end 26c, a back end 26d, a first side 26e, and a second side 26f (FIG. 2). Truck cap 26 is generally rectangular when viewed from above inasmuch as it is configured in the general shape of the cargo hold 14. Front end 26c, back end 26d, and sides 26e and 26f curve downwardly away from top surface 26a to provide an aerodynamic and aesthetically pleasing shape to truck cap 26. A pivot 30 (FIG. 2) secures front end 26c of cap member 26 to opposing members of frame 28 which are engaged with top edges of sides 18, 20. Pivot 30 enables truck cap 26 to pivot relative to frame 28 between a closed position (FIG. 1) and an open position (FIG. 4).

Referring to FIGS. 4 and 5, first and second lift assemblies 32, 34 secure truck cap 26 to a rear end of the side members of frame 28 or to parts of the first and second sides 18, 20. Lift assemblies 32, 34 are provided to assist in the raising of the rear end 26d of truck cap 26 away from tailgate 22. Lift assemblies 32, 34 are also configured to retain the rotated truck cap 26 in this raised position so that it will not accidentally fall back into the closed position, potentially hurting the driver or damaging cargo retained in cargo hold 14.

Lift assemblies 32, 34 may be of any suitable configuration. By way of example, each lift assembly 32 or 34 may comprise one or more lever arms. For example, lever arm 36 and lever arm 38 which connected together by a pivot 40. A first end 36a of lever arm 36 is pivotally engaged with truck cap 26 by a pivot 40. A second end of lever arm 36 engages a first end of lever arm 38 and an end 38a (FIG. 5) of lever arm 38 is engaged via pivot 40 to frame 28 or to the associated side 18, 20 of truck 10. In order to keep truck cap 26 in the raised and open position, a gas cylinder 42 is engaged with lever arm 36 and a piston 44 is engaged with another of the lever arms 38. (It will be understood that cylinder 42 may instead be engaged with lever arm 38 and the piston be engaged with lever arm 36.) Piston 44 is able to be extended and retracted from cylinder 42. When truck cap 26 is raised in the direction of arrow "A" (FIG. 4), piston 44 slides out of cylinder 42 and moves into the extended position relative to cylinder 42. This retains truck cap 26 in the raised position and stops truck cap 26 from accidentally moving in the opposite direction to arrow "A". Pressure has to be applied by the driver to push or pull truck cap 26 downwardly in the opposite direction to arrow "A". When truck cap 26 is lowered in this manner, piston 42 slides inwardly into cylinder in the direction of arrow "B" (FIG. 4), thereby moving piston 44 into the retracted position relative to cylinder 42.

A handle 46 is provided on the exterior of truck cap 26 and this handle 46 may be grasped by the driver to raise or lower truck cap 26 as described above. Truck cap 26 and tailgate 22 also include cooperating members of a lock assembly 48 (FIG. 5) for latching or locking truck cap 26 to frame 28 when truck cap is in a closed position. Lock assembly 48 may alternatively be secured to tailgate 22. A key slot of lock assembly 48 may be provided as part of handle 46. When truck cap 26 is in the closed position, lock assembly 48 is moved to a latched or locked position in order to lock truck cap 26 to tailgate 22. When this occurs, access to interior 24 and to bed 16 is prevented as truck cap 26 cannot move between the closed and open positions. In order to pivot truck cap 26 into the open position, the lock assembly 48 has to be moved to the unlocked position before the driver can raise the rear end of truck cap 26 away from tailgate 22. The unlatching or unlocking of lock assembly enables the truck cap 26 to be moved between the closed and open positions. Additionally, if lock assembly 28 is engaged with tailgate 22, then in order to open tailgate 22 when truck cap 26 is in the closed position, lock assembly 48 may need to be moved to the unlocked position.

In accordance with another aspect of the invention, truck cap 26 defines one or more apertures 50 (FIGS. 7 and 8) therein. Each aperture 50 extends between top surface 26a and bottom surface 26b of truck cap 26. The aperture 50 may be defined at any desired location on truck cap 26. So, for example, as shown in FIGS. 2 and 8, truck 10 has a longitudinal axis "Y" that extends between the front end 10a and rear end 10b thereof. A first aperture 50 extends generally parallel to longitudinal axis "Y" and is positioned proximate side 18. A second aperture 50 extends generally parallel to longitudinal axis "Y" and is positioned proximate side 20. Apertures 50 will provide access to the entire length of the bed 16 proximate the associated sides 18, 20 when truck cap 26 is in the closed position or in the closed and locked position. Both FIGS. 7 and 8 illustrate truck cap 26 in the closed or closed and locked positions but one or both apertures 50 being accessible so that the interior 24 and bed 16 of truck 10 is easily accessed. It should be noted that apertures 50 provide easy access to those portions of interior 24 and bed 16 which are immediately adjacent rear end 12a of cab 12.

FIG. 2 shows two longitudinally aligned apertures 50 defined in truck cap 26, however, it will be understood that only a single aperture 50 may be defined therein or more than two apertures may be defined therein. It will further be understood that the placement, size, shape and orientation of aperture 50 may be different to that illustrated herein.

A door 52 is mounted to truck cap 26 to close off access to each of the apertures 50 defined in truck cap 26. Door 52 is mounted to truck cap 26 by one or more hinges 53 and is configured to be seated onto a frame 56 and/or gasket 58 (FIGS. 6-8). Each door 52 is shaped to be complementary to the associated aperture 50 and door 52 is movable between an open position (FIGS. 7 and 8), where access to aperture 50 and therefore interior 24 and bed 16 is possible, and a closed position (FIG. 2), where access to aperture 50 is blocked.

Door 52 includes an exterior surface 52a (FIG. 2), an interior surface 52b (FIGS. 7 and 8), a first end 52c, a second end 52d, a first side 52e, and a second side 52f. When door 52 is in the closed position, exterior surface 52a thereof is in the same plane as the top surface 26a of truck cap 26.

One or more door lift assemblies 54 (FIG. 7) are provided to assist the driver in opening door 52 and for retaining door 52 in the raised position. The number of door lift assemblies 54 utilized is dependent upon the size and weight of the door 52. For example, longitudinally extending door 50 (FIG. 7) has two door lift assemblies 54 engaged therewith. Door lift assemblies 54 are configured so as to cause door 52 to pivot in the direction of arrow "C" (FIG. 6) and into an open position relative to truck cap 26 and to retain the door 52 in the open position. Door lift assemblies 54 are positioned so that when door 52 is pivoted into the open position, second side 52f thereof will remain adjacent top surface 26a of truck cap 26 and first side 52e thereof will move a distance outwardly away from top surface 26a of truck cap 26.

Mounting frame 56 is provided on truck cap 26 and this mounting frame 56 circumscribes aperture 50, as can be seen in FIG. 8. Gasket 58 is provided on mounting frame 56 to seal door 52 to truck cap 26 when door 52 is in the closed position. One end of each door lift assembly 54 is engaged with mounting frame 56 and the other end thereof is engaged with interior surface 52b of door 52. The end of door lift assembly 54 engaged with door 52 is secured to interior surface 52b adjacent first side 52e. Door lift assemblies 54 may be substantially similar to lift assemblies 32, 34 or may simply comprise a gas cylinder 60 and piston 62 which are engaged to door 52 and frame 56 by pivots 64. When door 52 is opened, piston 62 is extended and slides outwardly from cylinder 60 and keeps door 52 in the opened position unless force is applied to door 52. When door 52 is closed, piston 62 is retracted and slides into cylinder 60.

Each door 52 is also provided with a door handle 66 which is used by the driver to raise or lower door 52. A door locking assembly 68 (FIGS. 6-8) is also provided to selectively latch or lock door 52 to mounting frame 56 and thereby to truck cap 26. In order to move door 52 from a closed and latched or locked position to an open position, the lock assembly 68 must be moved to an unlocked position and then door 52 may be rotated into an open position. When door 52 is rotated into the closed position, then door lock assembly 68 is engaged to selectively latch or lock door 52 to truck cap 26.

FIGS. 8 and 9 show truck cap 26 in the closed position with both doors 52 in the open position. The driver may thus access portions of bed 23 and space 24 adjacent rear end 12a of cab 12 and sides 18, 20.

FIGS. 10 and 11 show alternative possible configurations for apertures 50 and doors 52. Thus, even when truck cap 26 is in the closed position or in the closed and locked position, the driver may gain access to particular parts of bed 16, where those particular locations are generally under and adjacent to apertures 50a.

When a driver wishes to load or unload cargo, he or she can select whether to open the entire truck cap 26 or to open one or more of doors 52. If access is needed to the entire bed 16, the driver can unlock lock assembly 48 and using handle 46 can raise the rear end of truck cap 26. This will cause truck cap 26 to rotate about pivot 30 and cause the rear end of truck cap 26 to move in the direction of arrow "A" and into an open position. Tailgate 22 may also be opened and rotated in the direction of arrow "B". Cargo may then be loaded onto bed 16 or removed from bed 16.

If the driver decides that he or she only needs limited access to bed 16, he or she will select which of the one or more doors 52 will provide them with access to the region of bed 16 they wish to access. So, for example, if the driver wishes to gain access to a region immediately adjacent rear end 12a of cab 12 and proximate side 18, the drive will unlock lock assembly 68 on the adjacent door 52. Using the associated handle 68, the driver will move the door 52 to the open position by raising door 52 in the direction of arrow "C" (FIG. 6). Cargo may then be placed on the bed 16 proximate rear end 12a and side 18 or may be removed therefrom. If necessary, the driver may open one or more doors 52 and truck cap 26. This may be necessary in order to access regions of bed 16 that would be difficult to access by simply opening only one of the doors 52 or truck cap 26.

When access to bed 16 is no longer needed, any previously opened doors 52 and truck cap 26 are moved from the open position to the closed position and the associated lock assemblies 68 and/or 48 are moved from the unlocked position to the locked position.

It will be understood that while truck cap 26 has been illustrated as having doors 52 which are pivotally engaged with truck cap 26 and are rotatable between an open and closed position; doors 52 may instead be mounted for sliding movement relative to the truck cap 26 so that the may be slid between open and closed positions.

It will further be understood that instead of truck cap being pivotally engaged with a front end of the frame and the pivot 30 being positioned adjacent rear end 12a of cab 12, truck cap 26 could instead be pivotally mounted to a rear end of frame 28 adjacent tailgate, or one side of truck cap 26 could be pivotally engaged with a frame member engaged with one of the first and second sides 18, 20. Thus, the raised and opened end of truck cap 26 would simply be differently orientated by substantially the entire interior 24 of cargo hold would be accessible for the loading and unloading of cargo.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the truck cap are an example and the invention is not limited to the exact details shown or described.

The invention claimed is:

1. A truck cap assembly for a cargo hold of a pickup truck, said truck cap assembly comprising:
   a truck cap having a top wall with four sides;
   a truck cap pivot having a truck cap pivot axis extending along a front side of the four sides of said truck cap to extend in a direction substantially orthogonal to a longitudinal axis of the pickup truck, and wherein a longitudinal length of said truck cap extending from the pivot axis to a rear end is movable between an open and closed position about said truck cap pivot axis;
   the top wall defining an aperture therethrough; and
   a door assembly coupled to the truck cap via a door pivot having a door pivot axis extending in a direction that is substantially orthogonal to the truck cap pivot axis to extend substantially parallel to the longitudinal axis of the pickup truck, and wherein the door assembly is movable about the door pivot axis between a closed position in which access through the top wall via the aperture is prevented and an open position in which access through the top wall via the aperture is permitted.

2. The truck cap assembly as defined in claim 1, wherein the truck cap assembly further includes:
   a frame that is adapted to be mounted to upper edges of opposed walls of the cargo hold; and wherein the truck cap is engaged with the frame and is pivotable about the truck cap pivot axis relative to the frame and between the closed position in which access between the frame and the truck cap is prevented and the open position in which access via a space between the frame and the truck cap is permitted.

3. The truck cap assembly as defined in claim 1, wherein the door assembly comprises a piston and gas cylinder mechanism mounted between the door and the truck cap to facilitate movement of the door toward the open position or to facilitate retention of the door in the open position, or to facilitate both.

4. The truck cap assembly as defined in claim 2, further comprising:
   a truck cap lift assembly engaged between the truck cap and the frame.

5. The truck cap assembly as defined in claim 4, wherein the truck cap lift assembly includes:
   a first lever arm having a first end and a second end;
   a second lever arm having a first end and a second end;
   a pivot rod securing the first end of the first lever arm to the first end of the second lever arm; and wherein the second end of the first lever arm is engaged with the bottom surface of the truck cap; and the second end of the second lever arm is engaged with the frame.

6. The truck cap assembly as defined in claim 5, wherein the truck cap lift assembly is movable between a retracted position and an extended position; and when the truck cap is in the closed position, the truck cap lift assembly is in the retracted position; and when the truck cap is in the raised position, the truck cap lift assembly is in the extended position.

7. The truck cap assembly as defined in claim 6, further comprising an actuating mechanism for moving the truck cap lift assembly between the retracted position and the extended position.

8. The truck cap assembly as defined in claim 7, wherein the actuating mechanism is a gas cylinder and a piston extending outwardly from the gas cylinder; and wherein one of the gas cylinder and piston is engaged with the first lever arm and the other of the gas cylinder and piston is engaged with the second lever arm; and wherein the piston is movable between a retracted and an extended position; and when the piston is in the extended position then the truck cap lift assembly is in the extended position; and when the piston is in the retracted position, the truck cap lift assembly is in the retracted position.

9. The truck cap assembly as defined in claim 1, further comprising a lock assembly adapted to selectively latch or lock the truck cap to the truck; and
   wherein the lock assembly is movable between a locked position and an unlocked position; and when the lock assembly is in the locked position the truck cap cannot move between the closed position and the open position; and when the lock assembly is in the unlocked position, the truck cap is able to move between the closed position and the open position.

10. The truck cap assembly as defined in claim 1, further comprising a handle provided on the truck cap.

11. The truck cap assembly as defined in claim 1, wherein the door assembly includes:
    a door that is complementary in size and shape to the aperture; said door being movable relative to a top surface of the truck cap between the open position and the closed position.

12. The truck cap assembly as defined in claim 11, wherein the door pivots relative to the truck cap.

13. The truck cap assembly as defined in claim 12, wherein the door assembly further comprises a mounting frame provided on the truck cap and circumscribing the aperture.

14. The truck cap assembly as defined in claim 13, wherein the door assembly further comprises a door lift assembly engaged with the door and with the mounting frame.

15. The truck cap assembly as defined in claim 14, where in the door lift assembly comprises:
    a gas cylinder engaged with one of the door and the mounting frame; and a piston operatively engaged with the gas cylinder and further engaged with the other of the door and the mounting frame.

16. The truck cap assembly as defined in claim 11, further comprising a locking assembly which is adapted to selectively latch or lock the door to the truck cap; and wherein the locking assembly is movable between a locked position and an unlocked position; and when the locking assembly is in the locked position, the door cannot move between the closed position and the open position; and when the locking assembly is in the unlocked position, the door is able to move between the closed position and the open position.

17. The truck cap assembly as defined in claim 11, further comprising a handle provided on the door.

18. In combination:
    a truck including a cab and a cargo hold extending rearwardly from the cab; said cargo hold including a bed extending rearwardly from a rear end of the cab, opposed side walls extending upwardly from the bed and rearwardly from the rear end of the cab; and a tailgate pivotally mounted to a rear end of the bed and extending between rear ends of the opposed side walls; said rear end of the cab, bed, side walls and tailgate bounding and defining an interior of the cargo hold which is adapted to carry a load; and a truck cap positioned to cover an opening to the interior of the cargo hold; said truck cap being pivotally coupled to the truck via a truck cap pivot having a truck cap pivot axis, the truck cap pivot axis extending in a direction substantially orthogonal to a longitudinal axis of the pickup truck, wherein a longitudinal length of said truck cap extending from the truck cap pivot axis to a rear end is pivotable about said truck cap pivot axis between an open position and a closed position;

an aperture extending through the truck cap; and a door assembly pivotally coupled to the truck cap via a door pivot having a door pivot axis extending in a direction that is substantially orthogonal to the truck cap pivot axis and substantially parallel to the longitudinal axis of the pickup truck, and wherein the door assembly is movable about the door pivot axis between a closed position in which access to the interior of the cargo hold via the aperture is prevented and an open position in which access to the interior of the cargo hold via the aperture is permitted.

19. The combination as defined in claim 18, wherein truck cap assembly further includes:

a frame that is adapted to be mounted to upper edges of the opposed side walls of the cargo hold; and wherein the truck cap is engaged with the frame and is pivotable relative to the frame between the closed position in which access between the frame and the truck cap is prevented and the open position in which access via a space between the frame and the truck cap is permitted.

20. The combination as defined in claim 19, wherein the door assembly includes:

a door that is complementary in size and shape to the aperture; said door being movable relative to a top surface of the truck cap between the open position and the closed position.

21. The combination as defined in claim 20, wherein the door pivots relative to the truck cap.

22. The truck cap assembly as defined in claim 18, wherein the door assembly comprises a piston and gas cylinder mechanism mounted between the door and the truck cap to facilitate movement of the door toward the open position or to facilitate retention of the door in the open position, or to facilitate both.

* * * * *